United States Patent
Stokes, III et al.

(10) Patent No.: US 7,251,322 B2
(45) Date of Patent: Jul. 31, 2007

(54) SYSTEMS AND METHODS FOR ECHO CANCELLATION WITH ARBITRARY PLAYBACK SAMPLING RATES

(75) Inventors: Jack W. Stokes, III, North Bend, WA (US); Henrique S. Malvar, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 606 days.

(21) Appl. No.: 10/785,690

(22) Filed: Feb. 24, 2004

(65) Prior Publication Data
US 2005/0089148 A1 Apr. 28, 2005

Related U.S. Application Data

(60) Provisional application No. 60/514,442, filed on Oct. 24, 2003.

(51) Int. Cl.
*H04M 9/08* (2006.01)
(52) U.S. Cl. ................................. 379/406.12
(58) Field of Classification Search ............ 379/406.14
See application file for complete search history.

(56) References Cited

U.S. PATENT DOCUMENTS

| | | | | |
|---|---|---|---|---|
| 5,566,167 | A * | 10/1996 | Duttweiler | 370/290 |
| 5,917,809 | A * | 6/1999 | Ribner et al. | 370/286 |
| 5,937,060 | A * | 8/1999 | Oh | 379/406.14 |
| 6,185,299 | B1 | 2/2001 | Goldin | |
| 6,473,409 | B1 | 10/2002 | Malvar | |
| 6,487,574 | B1 | 11/2002 | Malvar | |
| 6,496,795 | B1 | 12/2002 | Malvar | |
| 6,532,289 | B1 | 3/2003 | Magid | |
| 7,113,491 | B2 * | 9/2006 | Graziano et al. | 370/286 |
| 2003/0101206 | A1 * | 5/2003 | Graziano et al. | 708/277 |
| 2003/0118177 | A1 * | 6/2003 | Karakas et al. | 379/406.01 |

OTHER PUBLICATIONS

Erdogan et al., "Efficient Implementation of Echo Canceller for Applications with Asymmetric Rates", 2003, IEEE, Int. Conf. on Acoustic, Speech and Signal Processing, ICASSP 2003; Apr. 6-10, 2003; pp. VI-233-VI-236.*
Jack W. Stokes, et al., Acoustic Echo Cancellation with Arbitrary Playback Sampling Rate, IEEE International Conference on Acoustics, Speech and Signal Processing, 2004, 4 pages, Montreal, Canada.

(Continued)

*Primary Examiner*—Ramnandan Singh
(74) *Attorney, Agent, or Firm*—Amin, Turocy & Calvin, LLP

(57) ABSTRACT

The present invention relates to systems and methods that remove echo from a signal via a novel echo cancellation technique that supports arbitrary playback sampling rates. The novel echo cancellation technique transforms a playback signal to a frequency domain representation and converts its sampling rate to a sampling rate of a frequency domain transformed received signal for the appropriate number of frequency bins. This conversion is achieved via an exact or interpolated approached. The re-sampled playback signal transform is then utilized in connection with the received signal transform to remove echo associated with the playback signal from the received signal.

14 Claims, 14 Drawing Sheets

OTHER PUBLICATIONS

Henrique S. Malvar, Fast Algorithm for the Modulated Complex Lapped Transform, IEEE Signal Processing Letters, 2003, pp. 8-10, vol. 10-No. 1.

Henrique Malvar, A Modulated Complex Lapped Transform and its Applications to Audio Processing, Microsoft Research, 1999, 9 pages.

Christina Breining, et al., Acoustic Echo Control: An Application of Very-High-Order Adaptive Filters, IEEE Signal Processing Magazine, 1999, pp. 42-69.

L. Freund, et al., A Codesign Experiment in Acoustic Echo Cancellation: GMDF, ISSS'96, 1996, pp. 83-88.

R. Quelavoine. European Search Report. The Hague, Dec. 15, 2004, 2pp.

A. Erdogan, et al., Efficient implementation of echo canceller for applications with asymmetric rates, 2003, IEEE International Conference on Acoustics, Speech, and Signal Processing, vol. 6, Hong Kong, China, Apr. 6, 2003, pp. 233-236.

J.W. Stokes, et al., Acoustic echo cancellation with arbitrary playback sampling rate. 2004 IEEE International Conference on Acoustics, Speech, and Signal Processing, vol. 4, Montreal, Canada, May 17, 2004, pp. 153-156.

M. Mohan Sondhi, et al. Stereophonic Acoustic Echo Cancellation-An Overview of the Fundamental Problem, IEEE, 1995, <http://homes.esat.kuleuven.be/~tvanwate/alari/projects/echo_cancellation/sondi95.pdf>, last accessed on Nov. 17, 2006, 4 pages.

Paulo J. S. G. Ferreia, Interpolation in the Time and Frequency Domains, IEEE, 1996, <http://www.ieeta.pt/~pjf/PDF/Ferreira96a.pdf>, last accessed on Nov. 17, 2006, 3 pages.

Richard E. Blahut, Fast Algorithms for Digital Signal Processing, Addison-Wesley, 1987.

Ronald E. Crochiere, et al. Multirate Digital Signal Processing, Prentice-Hall, 1983.

\* cited by examiner

SYSTEMS AND METHODS FOR ECHO CANCELLATION WITH ARBITRARY PLAYBACK SAMPLING RATES

CROSS-REFERENCE TO RELATED APPLICATION(S)

This application claims the benefit of U.S. Provisional Patent Application Ser. No. 60/514,442 filed on Oct. 24, 2003 and entitled "ACOUSTIC ECHO CANCELLATION WITH ARBITRARY PLAYBACK SAMPLING RATE," the entirety of which is incorporated herein by reference.

TECHNICAL FIELD

The present invention generally relates to signal processing, and more particularly to systems and methods that employ frequency domain transform-based echo cancellation with arbitrary playback sampling rates. Specifically, this invention can be applied to frequency domain transform-based acoustic echo cancellation (AEC) with arbitrary playback sampling rates.

BACKGROUND OF THE INVENTION

Communications systems are commonly utilized to transfer data from one entity to another (uni-directional) or exchange data between entities (bi-directional), including half and/or full duplex data exchange, wherein data can be concurrently transmitted and received by one or more communicating entities. In many instances, such data can include graphics (e.g., still pictures and video), text and/or audio (e.g., voice and sound). In instances where the data includes audio, a receiver (e.g., a microphone) associated with one of the entities can receive a desired signal(s), noise and undesirable echo, for example, associated with reverberations from a concurrently transmitted audio signal from the entity.

By way of example, echo typically is present when utilizing a hands-free (e.g., an intercom) telephone when a user talks into the microphone and the microphone concurrently picks up background sounds, including voice from the telephone's loudspeaker. In these instances, the microphone receives the desired signal (e.g., a user utterance), noise (e.g., background sounds) and voice from the speaker. In addition, the voice can reflect off structures such as walls, for example, to produce echo that can be concurrently captured by the receiver. Examples of other applications susceptible to echo include multimedia communications equipment, Internet gaming and speech recognition.

Conventionally, techniques such as boundary detection or adaptive subband acoustic echo cancellation (AEC) have been utilized to work around or remove echo in a received signal. In general, AEC is typically employed by real time communications (RTC) applications so that a user can audibly communicate without using a headset. However, current AEC algorithms often restrict the playback sampling rate (the sampling rate of the data sent to the speakers via a sound card) to that of received signal sampling rate (the sampling rate of the data captured by the microphone through the same or a different interface).

This solution can be useful, but it can limit quality of audio played by other applications. For example, if a user desires to play CD quality music at 44.1 kHz while making a real-time call, the music will be down-sampled to a sampling rate of the real-time call, which reduces the quality of music heard by the user. Conventional solutions typically include computationally expensive sampling rate converters with high-order filters (with numerous taps), and they generally are associated with additional time delays and are susceptible to aliasing artifacts.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to novel acoustic echo cancellation (AEC) techniques that support arbitrary playback sampling rates. Conventional systems typically restrict playback sampling rates to the sampling rates of concurrently received signals, which limits the quality of sound that can be played back. By way of example, if a user desires to play CD quality music (44.1 kHz) while making a real-time call, the music will be down-sampled to the sampling rate of the real-time call (e.g. from 44.1 kHz to 16 kHz); thus, the quality of music heard by a user is reduced. Work-arounds typically involve computationally expensive sampling rate converters with high-order filters with numerous taps, and they generally are associated with additional time delays and are susceptible to aliasing artifacts.

The novel AEC techniques of the present invention remove echo without utilizing computationally expensive sampling rate converters. In general, the present invention converts a playback signal's sampling rate to a sampling rate of a received (or captured) signal through processing steps that are internal to the AEC architecture and that provide full-bandwidth playback of the signal sent to a speaker(s). More particularly, frequency-domain transforms are computed for a received and a playback signal with different transforms lengths (typically powers of two or highly composite integers, factorable as $2^m$ or $5 \cdot 2^m$, for example), wherein the transform for the playback signal is converted (e.g., via an exact transform or interpolation) in the frequency domain to match the transform size of the received signal for an appropriate number of frequency bins. The re-sampled playback signal transform is then utilized in connection with the received signal transform to remove echo from the received signal.

The foregoing can be implemented in real-time applications with no noticeable distortion in the signals. In comparison, traditional time-domain-based sampling rate converters need high-order filters to avoid noticeable aliasing artifacts. In addition, the present invention can be utilized in various other applications such as speech recognition and Internet gaming. For example, speech recognition engines often capture speech data from a microphone at a lower sampling rate than music playback (typically 16 kHz or 22.05 kHz). Thus, the invention can provide full-bandwidth playback during normal computer operation, to cancel higher-sampling-rate sounds such as system sounds, music, or audio from a DVD. Likewise, Internet gaming applications often transmit users' voice data across the internet. This data is usually sampled at lower rates, such at 8 kHz, 11.025 kHz, or 16 kHz. However, game sounds are often played at higher sample rates, such as 22.05 kHz or 44.1 kHz. Therefore, the invention can be employed to provide full-bandwidth game sounds to be played. Moreover, the invention can be utilized in instances where the capture sampling rate is higher than the playback sampling rate. For example, some computer games use 11.025 kHz sound for playback, but voice may be transmitted over the Internet at 16 kHz.

In one aspect of the present invention, an echo cancellation system comprising an input component and a signal processing component is provided. The input component is utilized to obtain a first signal that includes a desired signal, echo and noise, and a second signal associated with the echo component of the first signal. After suitable signal processing, or conditioning, the second signal is employed to remove at least a portion of the echo from the first signal. Echo removal can be achieved by any known echo removal algorithm, such as acoustic echo cancellation (AEC) and signal subtraction techniques, for example. In addition, the system can be used to remove at least a portion of the noise component. The foregoing can remove echo from a signal associated with real-time and non real-time application such as audio systems, speech recognition systems, broadband modem communication, and Internet gaming, for example.

In another aspect of the invention, the echo cancellation system can further comprise a converter and a filter. The converter can be utilized to re-sample the second signal—for example, the second signal can be a digital signal with a second sampling rate that is different from the sampling rate of the first signal. Upon transforming the second signal from the time domain to the frequency domain, the transform can be re-sampled (e.g., via an exact transform or interpolation) such that the sample rate of the second signal matches the sample rate of the first signal. The re-sampled transform associated with the second signal and a frequency domain transform of the first signal can be conveyed to the filter, wherein the filter can be utilized to remove the echo from the first signal. It is to be appreciated that such filtering can alternatively be performed in the time domain with analog and/or digital signals.

In yet another aspect of the present invention, an exemplary adaptive subband-based AEC system with combined frequency domain transform and sampling rate conversion is depicted. The system comprises a transmitter that transmits an analog converted audio signal and a receiver that captures audio signals. In one aspect of the present invention, the system can be utilized to capture a desired signal. Along with the desired signal, noise and/or echo associated with the transmitted signal can be concurrently received. The subject system employs a novel AEC technique that removes echo from the captured signal. The novel technique employs sample rate conversion, which enables the transmitted audio signal to be sampled at a different rate than the captured signal. For example, the transmitted signal can be frequency domain transformed and then re-sampled such that the sampling rate matches that of the captured signal. Then, the re-sampled frequency domain transform and a frequency domain transform associated with the captured signal can be provided to an AEC, which utilizes the re-sampled transform to remove echo from the captured signal. The AEC can execute various algorithms (e.g., a Fourier transform (FFT), a windowed FFT, or a modulated complex lapped transform (MCLT)) to facilitate signal transformations.

In other aspects of the present invention, methodologies are provided that facilitate echo removal for a captured signal. In addition, various graphs depict exemplary interpolation schemes and echo return loss enhancement (ERLE) comparisons of various approaches that can be employed in accordance with the subject invention.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
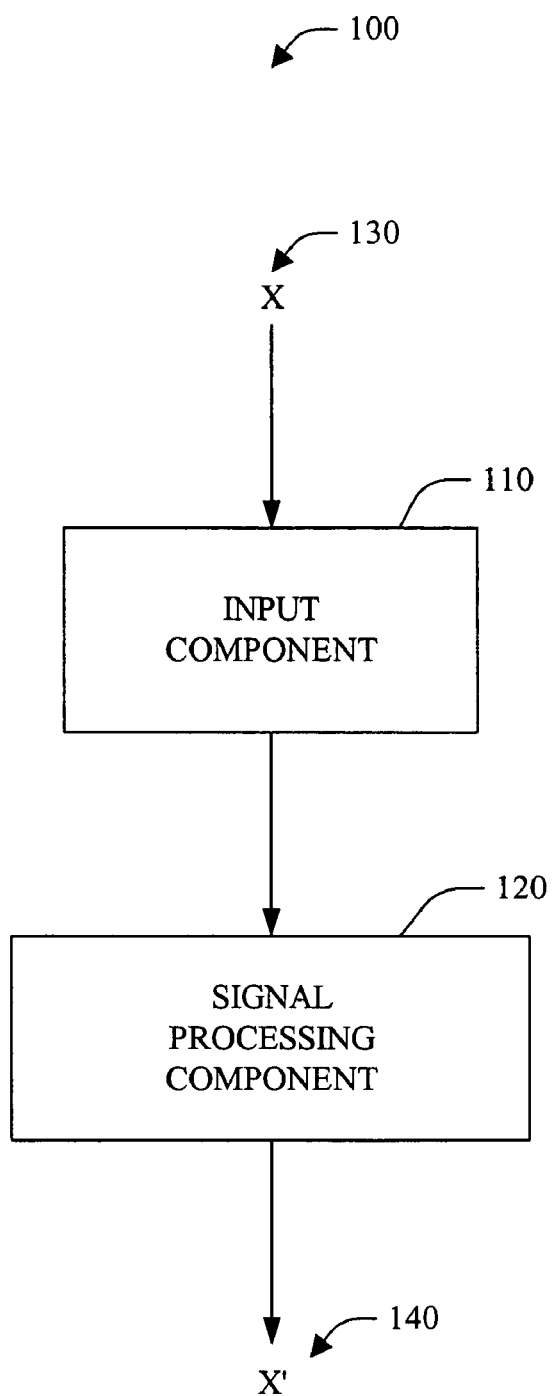
FIG. 1 illustrates an exemplary system that facilitates echo removal from a captured signal.

The present invention provides systems and methods for adaptive subband acoustic echo cancellation (AEC) with arbitrary playback sampling rates. In general, the systems and methods transform a playback signal to the frequency domain and convert its sampling rate to a sampling rate associated with a frequency domain transformed received signal. This conversion can be achieved via an exact transform or by interpolating the playback signal in the frequency domain to match the transform size of the received signal for the appropriate number of frequency bins. Suitable transforms include, for example, the fast Fourier Transform (FFT), the windowed FFT, and the Modulated Complex Lapped Transform (MCLT). The foregoing can be performed internally to the AEC architecture, which provides an improvement over conventional techniques that employ computationally expensive sampling rate converters.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

FIG. 1 illustrates an echo cancellation system 100. The echo cancellation system 100 comprises an input component 110 that receives at least one signal and a signal processing component 120 that removes echo from the signal. As illustrated, the input component 110 receives a signal X as depicted at 130 and conveys X to the signal processing component 120. Typically, X comprises a desired signal, noise and echo associated with a transmitted signal. As noted below, noise can be filtered, at least in part, at any stage (prior to reception by the input component 110, when received by the input component 110, during conveyance to the signal processing component 120, when received by the signal processing component 120, and/or when output from the signal processing component 120) of signal conveyance. Echo, on the other hand, typically is removed by the signal processing component 120.

Echo removal can be achieved by any known echo removal algorithm such as acoustic echo cancellation (AEC) and signal subtraction techniques, for example. For example, X can be suitably conditioned, and then a signal associated with the echo can be subtracted from X. In another example, components of X that are correlated with the signal associated with the echo can be removed from X, wherein a correlation threshold (e.g., 0 to 1 with energy normalized signals) can be defined to determine whether a correlated component is removed.

It is to be appreciated that conditioning X can include modifying the sampling rate, frequency, period, wavelength, amplitude, polarity, phase, etc. In addition, such modification can be determined based on similar characteristics of the signal associated with the echo. Such information can be provided to the signal processing component 120 and/or the signal processing component 120 can determine such information, for example, via information extraction, analysis, inference, implication, history, etc.

A resultant signal X' at 140, which is X with at least a portion of the echo removed, is output from the signal processing component 120. X' can be further processed, stored, conveyed to another component, etc. The foregoing can be utilized to remove echo from a signal associated with a real-time or non real-time application, wherein a desired signal can be received along with echo from a transmitted signal. Examples of such systems include, but are not limited to, audio systems, speech recognition systems and Internet gaming, for example.

Figure 2:
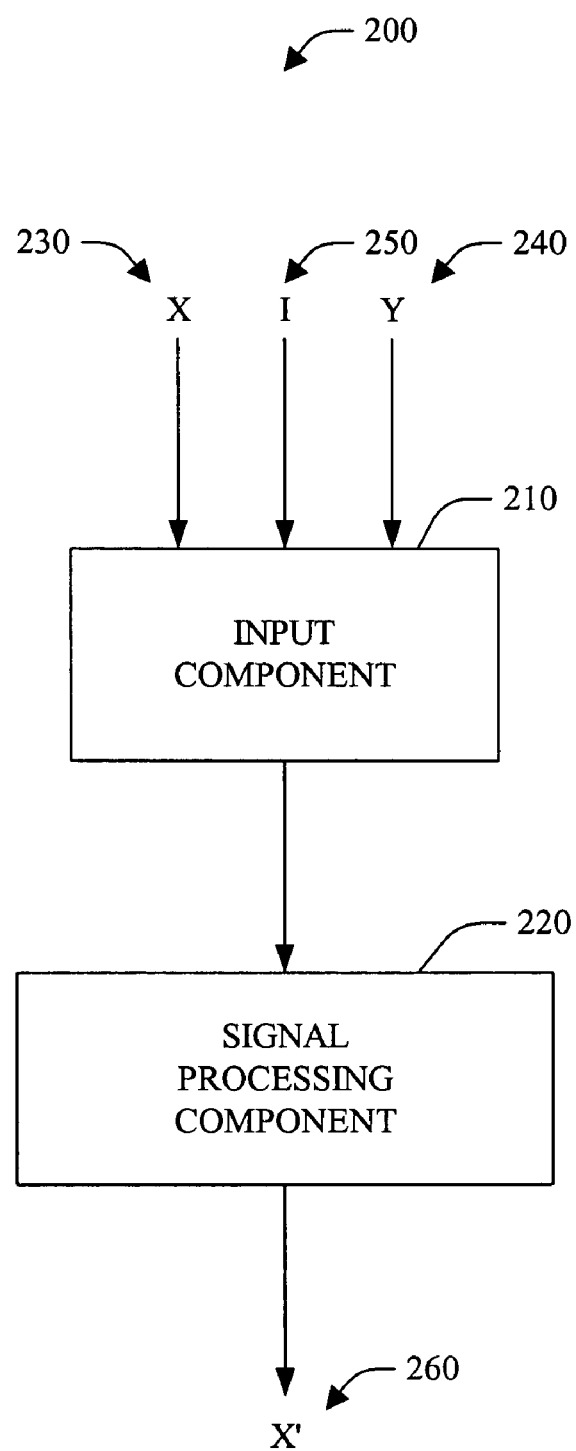
FIG. 2 illustrates a second exemplary system that facilitates echo removal from a captured signal.

FIG. 2 illustrates an echo cancellation system 200. The echo cancellation system 200 comprises an input component 210 that receives signals and/or associated information and a signal processing component 220 that utilizes this data to remove echo from at least one of the signals. As depicted, the input component 210 receives a signal X at 230, a signal Y at 240, and, optionally, information I at 250. The optional information I can be associated with one or both accepted signals and include signal related characteristics such as sampling rate, frequency, period, wavelength, amplitude, polarity, phase, etc. Where optional information I is not provided to the input component 210, the aforementioned, as well as other, signal characteristics can be determined via techniques such as extraction, analysis, inference, implication, history, etc.

Upon receiving the signals X and Y, and/or the optional information I, respective data can be conveyed to the signal processing component 220. As briefly noted above, the signal processing component 220 utilizes this data to remove echo from at least one of signal X or Y. For explanatory purposes, the signal X is assumed to be the signal under echo removal. Typically, the signal X comprises a desired signal, noise and echo associated with the signal Y. As noted previously, noise can be filtered, at least in part, at any stage of signal conveyance, and echo typically is removed by the signal processing component 220. It is to be understood that essentially any known algorithm can be utilized to remove echo such as acoustic echo cancellation (AEC) and various other subtraction techniques. For example, the signal X and the signal Y can be suitably conditioned, and then the signal Y can be subtracted from the signal X to remove signal Y related echo from the signal X. In another example, the signal X components that are correlated with signal Y can be removed from the signal X, wherein a correlation threshold (e.g., 0 to 1 with energy-normalized signals) can be defined to determine whether a correlated component is removed.

A resultant signal X' at 260, which is the signal X with at least echo associated with the signal Y removed, is output from the signal processing component 220. The output signal can be further processed, stored, conveyed to another component, etc. The foregoing can be utilized to remove echo from signals in real-time and non real-time applications, wherein a desired signal can be received along with echo from a transmitted signal. Examples of such systems include, but are not limited to, audio systems, speech recognition systems and Internet gaming, for example.

It is to be appreciated that at any stage—prior to reception by the input component 210, when received by the input component 210, during conveyance to the signal processing component 220, when received by the signal processing component 220, and/or when output from the signal processing component 220—signal X and/or signal Y can be conditioned or processed. For example, signal X and/or signal Y can be amplified, filtered (e.g., to remove noise), encrypted/decrypted, converted (e.g., analog to digital and vice versa), modulated/demodulated, extracted from a carrier, frequency shifted, transformed, etc.

Figure 3:
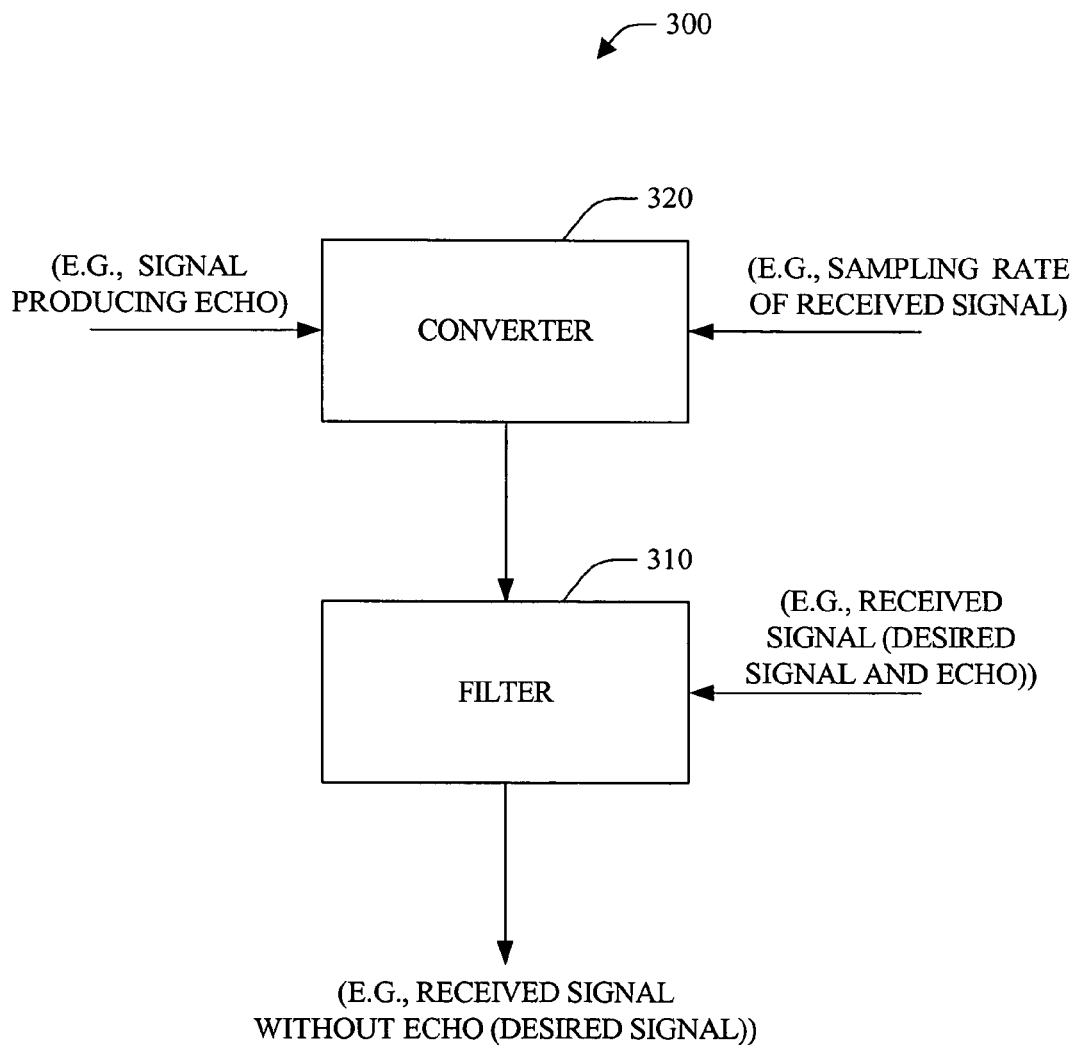
FIG. 3 illustrates an exemplary system that utilizes a sample converter and filter to facilitate echo removal from a captured signal.

FIG. 3 illustrates an exemplary signal processing system 300 that can be utilized to remove echo from a signal. The system 300 comprises a filter 310 that removes echo from a signal and a converter 320 that provides information that facilitates echo removal to the filter 310. In general, the filter 310 can receive a first signal that comprises a desired signal and echo and a second signal, which is a source of the echo.

The filter 310 utilizes the second signal to remove the echo from the first signal. After echo removal from the first signal, the resultant signal can be output from the filter 310.

The converter 320 can be utilized to suitably modify the second signal. For example, the converter can resample the second signal to match the sampling rate of the first signal. This can be advantageous when the second signal, as received by the converter 320, is associated with a sampling rate less than or greater than the sampling rate of the first signal. In instances wherein the sampling rate of the second signal is less than or greater than the first signal, the sampling rate of the first signal can be determined (e.g., provided to the converter 320 and determined by the converter 320) and utilized to facilitate re-sampling the second signal to match the sampling rate of the first signal.

By way of example, in one aspect of the present invention the first and second signals can be frequency transformed signals with different length transforms. The transform of the second signal can be re-sampled by the converter 320, for example, via interpolation (e.g., nearest neighbor, spline, other polynomial, nonlinear, ...) for the appropriate number of frequency bins. Where the length of the second signal transform is less than that of the first signal transform, the interpolation can include zero padding to extend the transform length, and where the length of the second signal transform is greater than that of the first signal transform, the interpolation can include discarding values to shorten the transform. The interpolated transform of the second signal can then be conveyed to the filter 310, which can utilize the transform to remove the echo from the transform of the first signal.

In order to re-sample the second signal utilizing the sampling rate of the first signal, the converter 320 can be provided with the sampling rate of the first signal and/or the first signal, wherein the converter 320 determines the sampling rate of the first signal. Since the second signal is re-sampled to match the sampling rate of the first signal, the foregoing can provide for adaptive sub-band acoustic echo cancellation (AEC) with arbitrary playback sampling rates, which can be an improvement over conventional systems that require computationally-expensive sampling rate converters.

Figure 4:
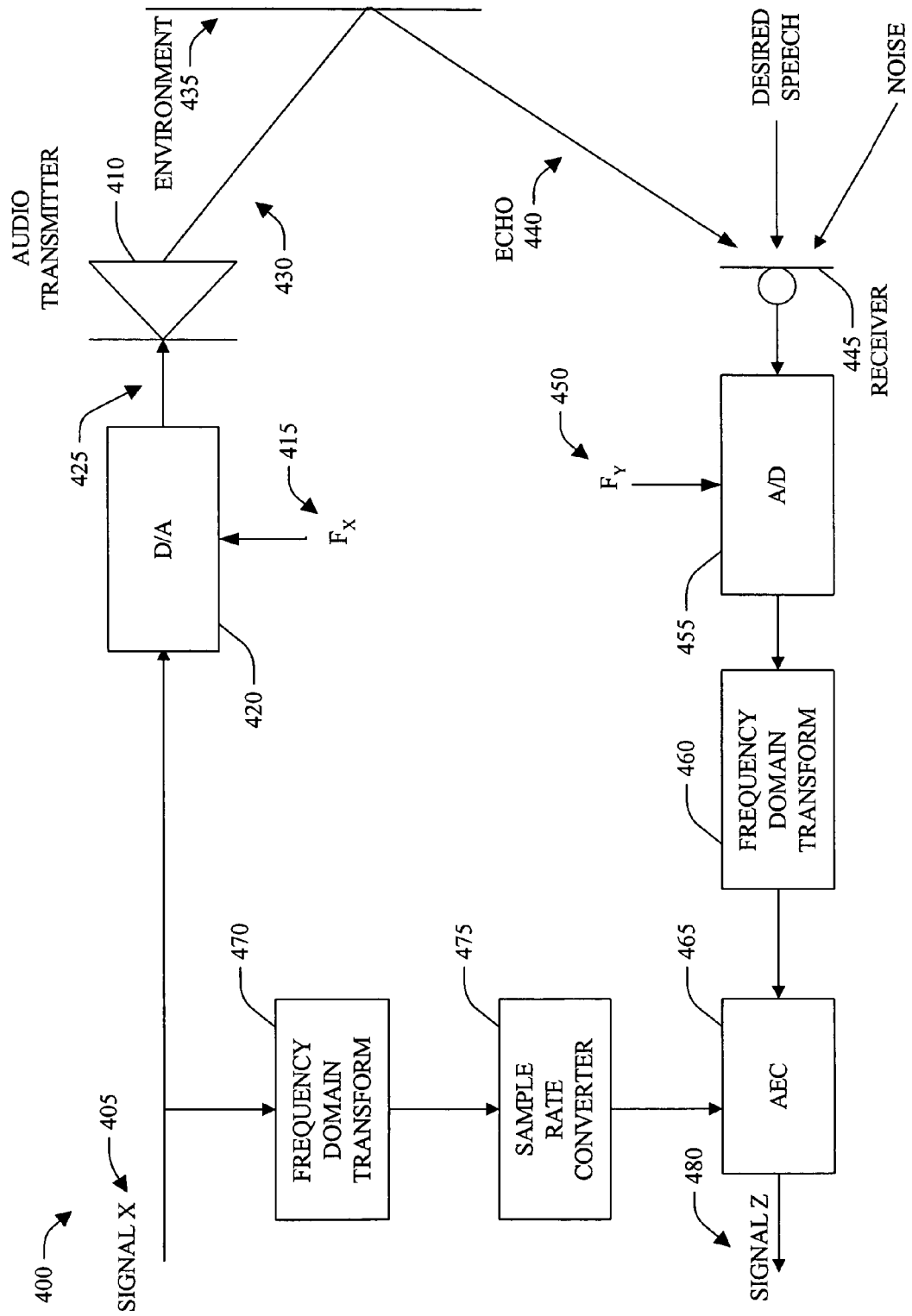
FIG. 4 illustrates an exemplary AEC system that employs a transform interpolation approach.

FIG. 4 illustrates an exemplary adaptive subband-based AEC system 400, which combines frequency domain transformation and sampling rate conversion. An audio signal X at 405 that is to be played by a transmitter 410 (e.g., a loudspeaker) with a sampling rate of $F_x$ 415 is conveyed to a digital-to-analog (D/A) converter 420. The resulting analog signal at 425 is provided to the transceiver 410, wherein the signal is converted (e.g., via a transducer) to an audio signal at 430. The audio signal can be heard by listeners, absorbed by surrounding structures, and/or reflected by environment 435 (e.g., walls). Such reflections can render an echo at 440 that can be received by a receiver 445 (e.g., a microphone) concurrently receiving a desired signal and/or noise. The received signals are converted to a digital signal with a sampling rate of $F_y$ 450 via an analog-to-digital (A/D) converter 455. The digital signal is conveyed to a frequency domain transform 460, wherein the signal is transformed from the time domain to the frequency domain.

The transformed signal is conveyed to the AEC System 465. The audio signal X can be transformed from the time domain to the frequency domain via a frequency domain transform 470. If sample rate $F_x$ 415 of the audio signal X matches sample rate $F_y$ 450, the AEC algorithm can run a frequency domain transform (e.g., a Fourier transform (FFT), a windowed FFT, or a modulated complex lapped transform (MCLT)) at the sample rate $F_y$ 450. However, where sampling rate $F_x$ 415 and sampling rate $F_y$ 450 do not match, the audio signal X is re-sampled to sampling rate $F_y$ 450 via sample rate converter 475. Essentially any known conversion approach can be utilized to sample rate convert the audio signal X to match $F_y$ 450. The AEC algorithm can then operate on the frequency-domain signals to generate an essentially echo free frequency-domain signal Z at 480. The system 400 can be utilized to remove echo without utilizing computationally expensive sampling rate converters that are typically employed with conventional systems. Examples of applications that can benefit from this novel approach include real-time applications, speech recognition and Internet gaming.

Figure 5:
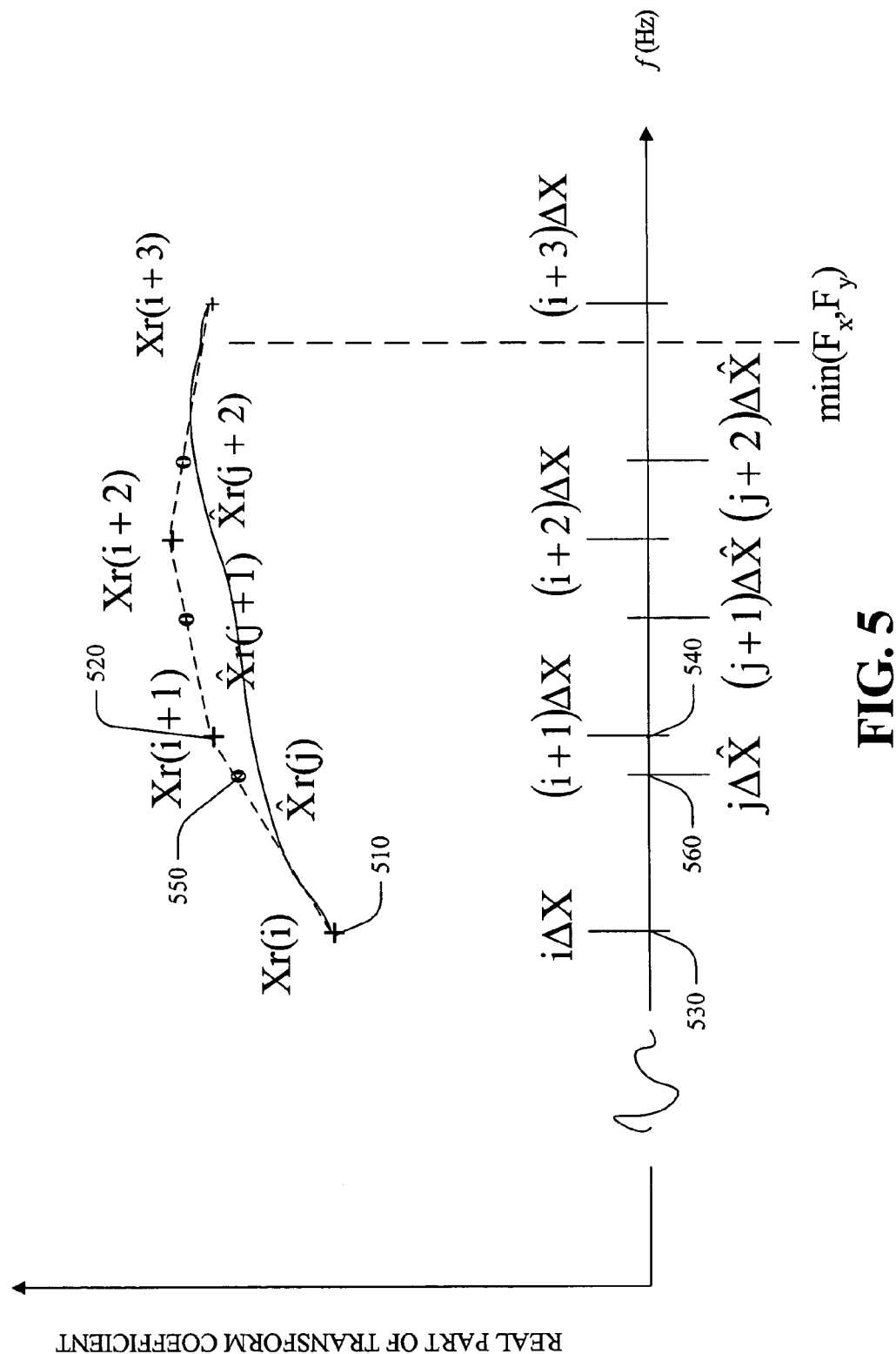
FIG. 5 illustrates a graph depicting an exemplary interpolation technique that can be utilized to re-sample a signal.

FIG. 5 illustrates a graph depicting exemplary interpolation that can be utilized to resample a signal. As noted above, when the playback sampling rate $F_x$ 415 does not match the received sampling rate $F_y$ 450, the transform of the play back signal is re-sampled to match sampling rate $F_y$ 450. The re-sampled transform size can be defined by Equation 1.

$$M = 2^{\lceil \log 2(N) \rceil}, \qquad \text{Equation 1:}$$

where N is the exact transformation size, M is the power of 2 transformation size, and $\lceil \log 2(N) \rceil$ is the ceiling function of $\log 2(N)$.

By way of example, assuming CD quality music (e.g., 44.1 kHz sample rate with 20 millisecond buffers) for explanatory purposes, the size of an exact MCLT transform for this case is N (e.g., 882) and the size of an interpolated MCLT is M (e.g., 1024). Unlike the N-point MCLT required for the exact frequency domain transform, the M point MCLT can be implemented utilizing a 2M (e.g., 2048 to mitigate aliasing) point fast Fourier transform (FFT). As a result, the M point MCLT can be implemented much faster than the N point MCLT. The 2M samples for the FFT typically is larger than the 2N (e.g., 1764) samples in conventional systems. The following four approaches (where M is greater than N, and M and N are integers) can be utilized to manage this difference:

Interpolate with a 2M point window and 2M data samples overlapped back in time;

Interpolate with a 2M point window and 2N data samples zero padded at the beginning;

Interpolate with a 2M point window and 2N data samples zero padded equally at both ends; or Interpolate with a 2M point window and 2N data samples zero padded at the end.

After running a longer size MCLT, the frequency domain subbands can be sample rate converted to match the appropriate frequency bin locations of received sample data. This sample rate conversion can be done by interpolating across the frequency domain bins. This is depicted in FIG. 5, which illustrates linear interpolation of the real parts of the frequency domain coefficients of a signal. It is to be appreciated that other types (e.g., higher order, non-linear, ...) of interpolation can alternatively and/or additionally be utilized. In the illustration, the real part of the frequency domain coefficients $Xr(i)$ and $Xr(i+1)$ can be interpolated at frequency bins i and i+1, as depicted at 510 and 520, respectively. These two frequency domain coefficients are located at frequencies 530 ($i\Delta X$) and 540 (($i+1)\Delta X$), respectively. The result of the linear interpolation $\hat{X}r(j)$ is depicted at 550 at frequency 560 ($j\Delta \hat{X}$). Similarly, linear interpolation can be utilized for the imaginary part of the frequency domain coefficients. The following illustrates exemplary pseudo code for calculating the complex interpolated data, $\hat{X}(j)$, from the original data, X(i):

```
i = 0; j = 0;
while (j < DesiredNumberFrequencyBins)
    ic = iΔX
    ic2 = (i + 1)ΔX
    jd = jΔX̂
```

$$\Delta \hat{X}(j) = \left( \frac{(ic2 - jd) * X(i) + (jd - ic) * X(i+1)}{(ic2 - ic)} \right)$$

```
    i = i + 1; j = j + 1;
    if ((i + 1)ΔX < jΔX̂)
        i = i + 1;
    end
end,
``` where the DesiredNumberFrequencyBins is the minimum number of frequency domain bins for the playback signal, which must be calculated in order to match the number of bins in the captured signal.

In another aspect of the present invention, an expansion of the form depicted in Equation 2 can be employed:

$$\hat{X}(m) = \alpha X(n) + \beta X(n+1) + \ldots + \lambda X(n+j) + \ldots, \quad \text{Equation 2}$$

where $\hat{X}(m)$ is the mth frequency bin of the linear interpolated transform, $\alpha X(n)$ is product of coefficient $\alpha$ and the nth frequency bin of a transformed signal x, $\beta X(n+1)$ is the product of coefficient $\beta$ and the nth plus 1 frequency bin of a transformed signal x, and $\lambda X(n+j)$ is the product of coefficient $\lambda$ and the nth plus j frequency bin of a transformed signal x.

In one specific example, Equation 2 can be reduced to Equation 3:

$$\hat{X}(m) = \alpha X(n) + \beta X(n+1), \quad \text{Equation 3}$$

and, where $$\alpha = \left[ (n+1) - m\left(\frac{\Delta \hat{X}}{\Delta X}\right) \right] \text{ and } \beta = \left[ m\left(\frac{\Delta \hat{X}}{\Delta X}\right) - n \right],$$

Equation 3 can be represented as depicted in Equation 4:

$$\hat{X}(m) = \left[ (n+1) - m\left(\frac{\Delta \hat{X}}{\Delta X}\right) \right] X(n) + \left[ m\left(\frac{\Delta \hat{X}}{\Delta X}\right) - n \right] X(n+1), \quad \text{Equation 4}$$

where $\Delta X$ is the width of the frequency bin of the transformed signal and $\Delta \hat{X}$ is the width of the frequency bin of the desired signal.

Figure 6:
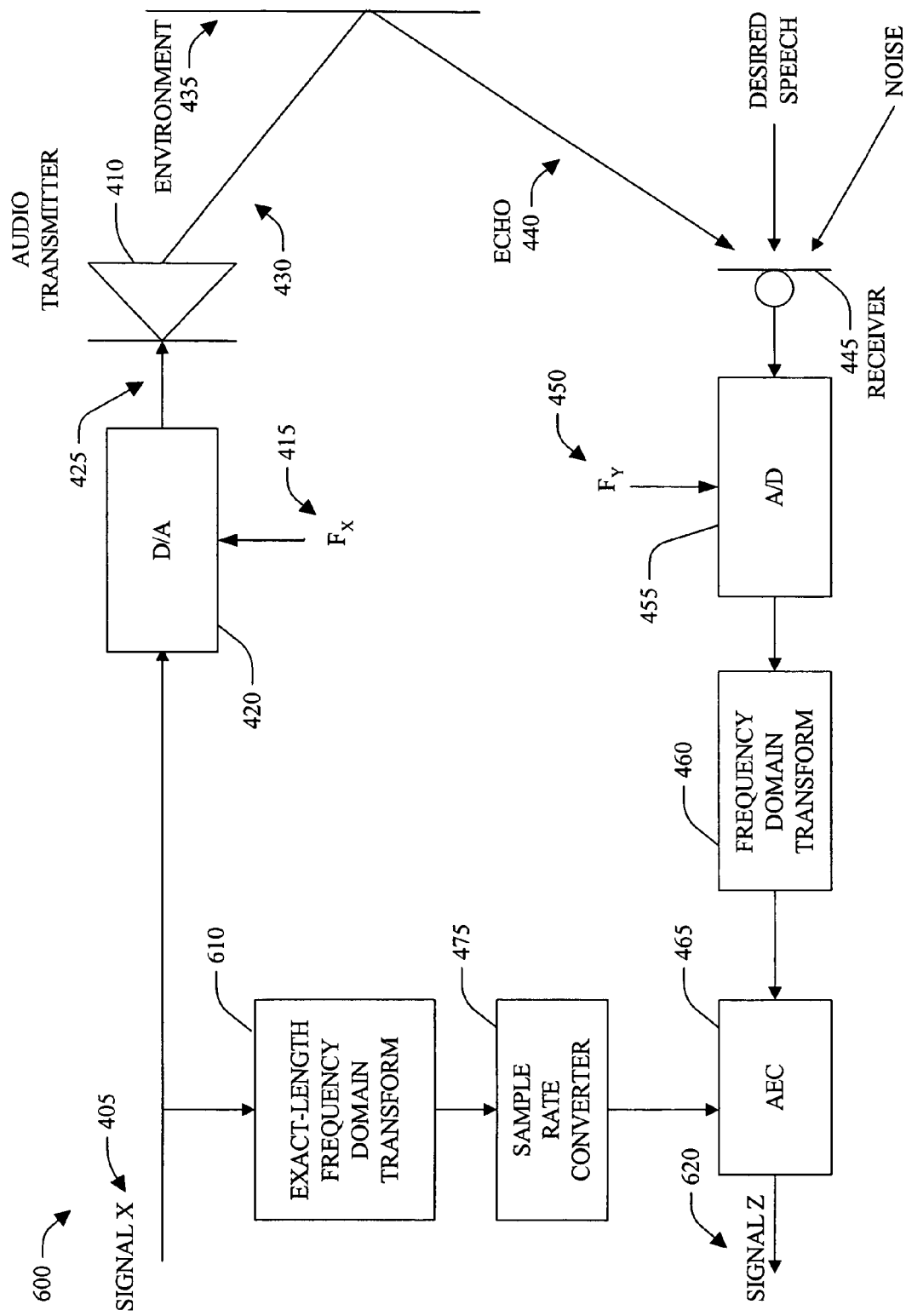
FIG. 6 illustrates an exemplary AEC system that employs an exact transform approach.

FIG. 6 illustrates an exemplary adaptive subband-based AEC system 600 that employs an exact frequency domain transform and sampling rate converter to render an efficient real-time AEC algorithm. The system 600 is similar to the system 400 except the system 600 alternatively employs a frequency domain transform 610 using an exact length, instead of the original frequency domain transform 470. In this exemplary embodiment, the sample rate converter does not need to perform frequency-domain interpolation; it just throws away coefficients (if the output sampling rate is higher), or performs zero padding (if the output sampling rate is lower). The converted signal and the digitized received signal can be conveyed to the AEC 465 to generate an essentially echo-free frequency-domain signal Z at 620.

In one aspect of the present invention, continuing with the earlier assumption of CD quality playback (44.1 kHz sampling rate with 20 millisecond frames), an N (e.g., 882) point MCLT can be implemented by a 2N (e.g., 1764) point discrete Fourier transform (DFT). For example, the value 2N can be determined by the product 2*2*3*3*7*7 and, thus, the MCLT can be implemented via the generalized Cooley-Tukey DFT. The following is exemplary exact windowing approach, where N is an integer.

A 2N (e.g., 1764) point window and 2N (e.g., 1764) data samples.

Figure 7:
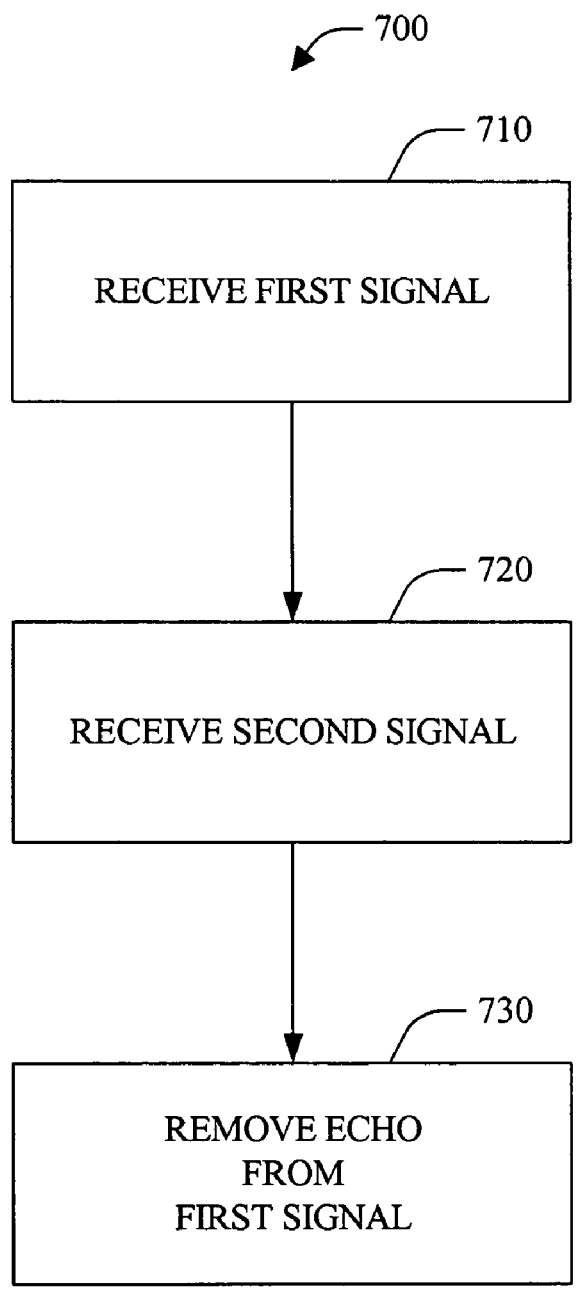
FIG. 7 illustrates an exemplary methodology that facilitates echo removal from a captured signal.
Figure 8:
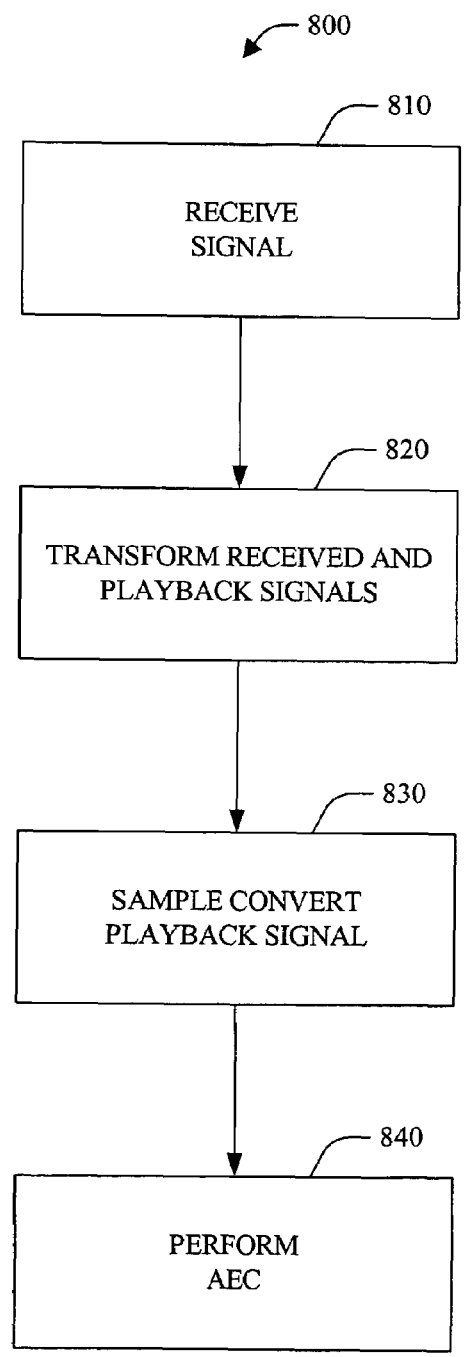
FIG. 8 illustrates a second exemplary methodology that facilitates echo removal from a captured signal.

FIGS. 7-8 illustrate methodologies 700 and 800 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 7 illustrates an exemplary echo cancellation methodology 700 that can be utilized with the systems described herein. At reference numeral 710, a first signal is received. The first signal can comprise a desired signal, echo and noise. The echo can be associated with a second signal that is transmitted concurrently with the capture of the first signal, wherein the second signal can be reflected by structures and captured by the same receiver capturing the desired signal. The noise and/or echo can be filtered from the first signal at similar and/or different stages of processing. Various techniques can be utilized to remove echo from the first signal. For example, acoustic echo cancellation (AEC) and signal subtraction techniques can be employed in accordance with aspects of the present invention.

At reference numeral 720, the second signal can be obtained. It is to be appreciated that both the first and second signals can be suitably conditioned to facilitate echo cancellation. Such conditioning can include modifying sampling rate, frequency, period, wavelength, amplitude, polarity, phase, filtering, encrypting, decrypting, D/A, A/D, modulating, demodulating, carrier extraction, transforming, etc. In addition, such modification can be determined based on similar characteristics of the signal associated with the echo. Such information can be provided to the signal processing component and/or determined, for example, via information extraction, analysis, inference, implication, history, etc.

In addition, the second signal can be re-sampled, for example, such that the second signal sampling rate matches the sampling rate of the first signal. This can be advantageous when the second signal, as received, is associated with a sampling rate less than or greater than the sampling rate of the first signal. In instances wherein the sampling rate of the second signal is less than or greater than the first signal, the sampling rate of the first signal can be determined and utilized to facilitate re-sampling the second signal to match the sampling rate of the first signal. By way of example, the first and second signals can be frequency transformed signals with different transform lengths. In order to match transform lengths, the transform of the second signal can be re-sampled via interpolation (e.g., linear and non-linear) for an appropriate number of frequency bins. Where the length of the second signal transform is less than that of the first signal transform, the interpolation can include zero padding to extend the transform length and where the length of the second signal transform is greater than that of the first signal transform, the interpolation can include discarding values to decrease transform size. Where the length of the second signal transform equals the length of the first signal transform, interpolation can be skipped or an algorithm with a transfer function of 1 can be utilized.

At 730, the first and second signals can be utilized in connection with the echo cancellation technique to render a resultant signal, or the first signal without echo. The resultant signal can then be conveyed for further signal processing or utilization. The foregoing can be utilized to remove echo from a signal associated with a real-time or non real-time application, wherein a desired signal can be received along with echo from a transmitted signal. Examples of such systems include, but are not limited to, audio systems, speech recognition systems, broadband communication, and Internet gaming, for example. The foregoing method provides for adaptive sub-band acoustic echo cancellation (AEC) with arbitrary playback sampling rates, which can be an improvement over conventional systems that require computationally-expensive sampling rate converters to handle to captured and playback signal sampling rate differences or that limit playback to sampling rate to that of the received signals.

FIG. 8 illustrates exemplary AEC methodology 800. At reference 810, a receiver (e.g., a microphone) is utilized to capture a desired signal. Concurrently, background noise and echo associated with playback signal are captured by the receiver. The playback signal can be digital audio converted (e.g., via D/A converter) to analog audio and subsequently transduced to sound (e.g., via speaker). The sound can be heard by listeners, absorbed by surrounding structures, and/or reflected by the environment (e.g., walls). Such reflections can render the echo captured by the receiver.

The received signals (the desired signal, echo and noise) can be converted to a digital signal with a first sampling rate via an analog-to-digital (A/D) converter. At reference numeral 820, the captured signal can be conveyed to a frequency domain transform, wherein the digital signal can be transformed from the time domain to the frequency domain. Similarly, the playback signal with a second sampling rate (e.g., less than, equal to or greater than the sampling rate of the capture signal) can be conveyed to a frequency domain transform, wherein the playback signal can be transformed from the time domain to the frequency domain.

At 830, the sample rate of the playback signal can be re-sampled if it does not match the sample rate of the captured signal. Such re-sampling can be achieved via interpolation or other known sampling techniques. At 840, the re-sampled playback signal transform and the captured signal transform can be conveyed to an AEC for echo cancellation. The AEC can employ any known algorithm such as a fast Fourier transform (FFT), a windowed FFT, or a modulated complex lapped transform (MCLT) to generate signal, which includes the desired signal with at least part of the echo removed.

The method 800 can be utilized to remove echo without utilizing computationally-expensive sampling rate converters that are typically employed with conventional systems. Examples of applications that can benefit from this novel approach include real-time applications, speech recognition, line echo cancellation, modems (particularly those based on multitone modulation), communication, and Internet gaming. With real-time applications, the foregoing can be implemented without noticeable signal distortion, unlike conventional time-domain-based sampling rate converters that require high-order filters to avoid noticeable aliasing artifacts. Speech recognition engines often capture speech data from a microphone at a lower sampling rate than music playback (typically 16 kHz or 22.05 kHz). Thus, the present invention can provide full-bandwidth playback during normal computer operation, to cancel higher-sampling-rate sounds such as system sounds, music, or audio from a DVD. Likewise, Internet gaming applications often transmit users' voice data across the internet. This data is usually sampled at lower rates, such as 8 kHz, 11.025 kHz, or 16 kHz. However, game sounds are usually played at higher sample rates, such as 22.05 kHz or 44.1 kHz. Therefore, the present invention can be employed to provide full-bandwidth game sounds to be played. Moreover, the invention can be utilized in instances where the capture sampling rate is higher than the playback sampling rate. For example, some computer games use 11.025 kHz sounds for playback, but the voice might be transmitted over the Internet at 16 kHz.

FIGS. 9-12 illustrate exemplary performance graphs for an AEC architecture that utilizes frequency-domain interpolation and exact transforms as described herein. For these results, a received mono signal with a sampling rate of about 16 kHz (which is typical of wideband conferencing) is utilized and a mono playback signal with a sampling rate of about 44.1 kHz (which is typical of system audio or CD-quality music playback) is utilized. The received echo signal is simulated using a transfer function measured in a standard corporate office with approximate dimensions 10'×10'×8'. The office's transfer function is estimated with playback and receive sampling rates at about 44.1 kHz. Convolving a music signal with the office's transfer function simulates an echo at about 44.1 kHz. The simulated echo signal is down-sampled via a high-quality polyphase filter to the desired received sampling rate of 16 kHz.

Subband AEC with adaptive subband filtering and MCLT-based subband decomposition are utilized. However, it is understood that other subband transforms, such as those based on over-sampled FFT filter banks, can be utilized. The received signal is processed using a 320-point MCLT and the playback signal is processed using a 1024-point MCLT for the following three interpolation approaches that were described in connection with system 400:

Interpolate with a 2048 point window and 2048 data samples overlapped back in time;

Interpolate with a 2048 point window and 1764 data samples zero padded at the beginning; and Interpolate with a 2048 point window and 1764 data samples zero padded equally at both ends, and the playback signal is processed using a 882-point MCLT for the following interpolation approach that was described in connection with system 600:

Exact transform with a 1764 point window and 1764 data samples.

The complex adaptive filters in respective subbands are processed utilizing a normalized least mean square (NLMS) technique. Results are compared based on echo return loss enhancement (ERLE), in dB, defined as by Equation 5:

$$ERLE(n) = 10\log_{10}\left(\frac{E\{y^2(n)\}}{E\{z^2(n)\}}\right), \qquad \text{Equation 5:}$$

where E { } is the expected value at time sample n. The expected value for non-overlapping length-N blocks is defined by Equation 6:

$$ERLE(k) = 10\log_{10}\left(\frac{\text{var}\{y(n:n+N-1\}}{\text{var}\{y(n-d:n+N-d-1\}}\right), \qquad \text{Equation 6:}$$

for the kth block of data where n is the time index at the beginning of the data block, var{ } is the variance of the block of data, and d represents the processing delay due to AEC processing. For AEC processing with MCLT, d is equal to two frames of data (e.g., 640 samples at 16 kHz).

Figure 9:
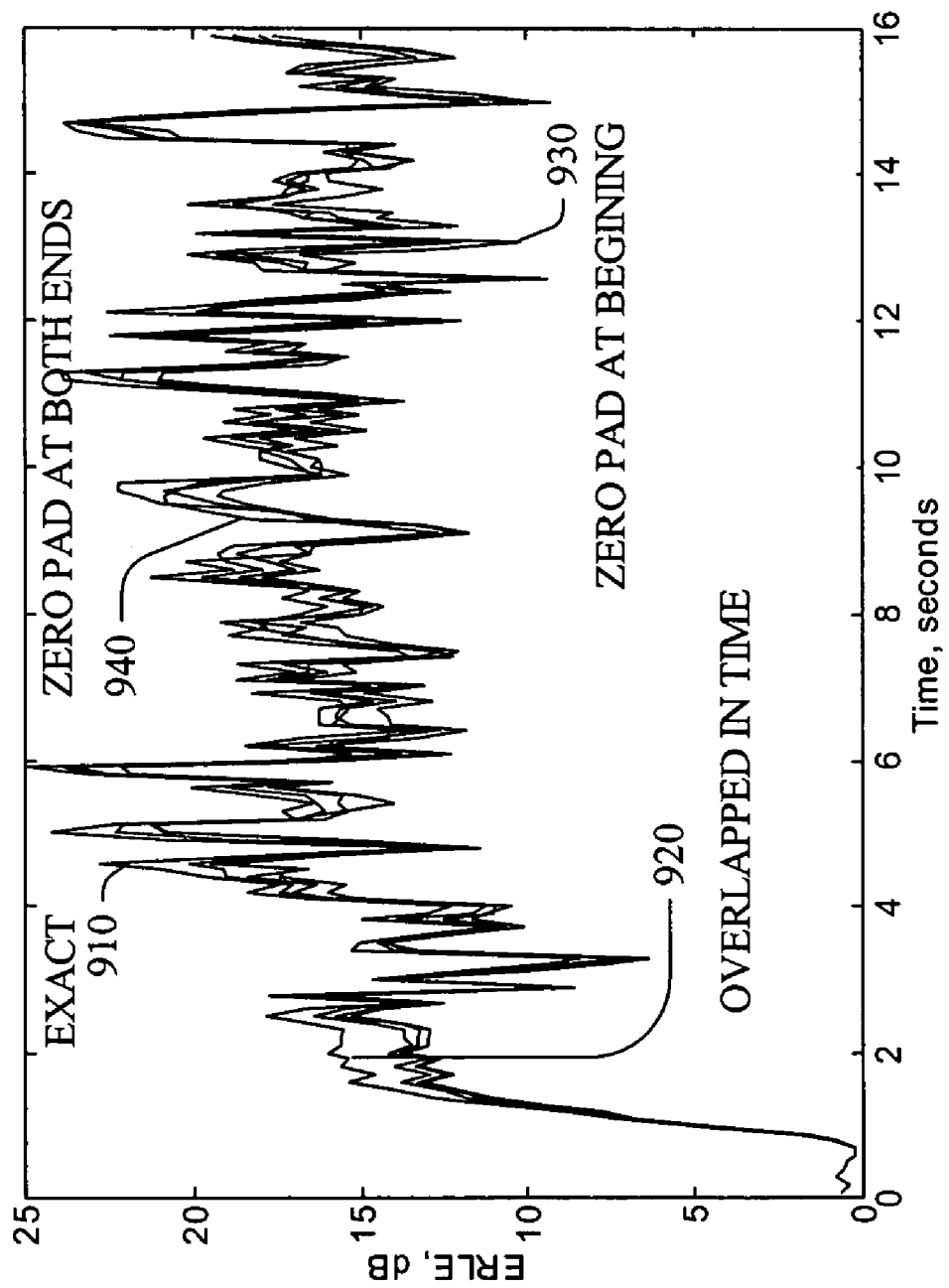
FIG. 9 illustrates exemplary echo return loss enhancement (ERLE) graphs averaged over 100 ms blocks.
Figure 10:
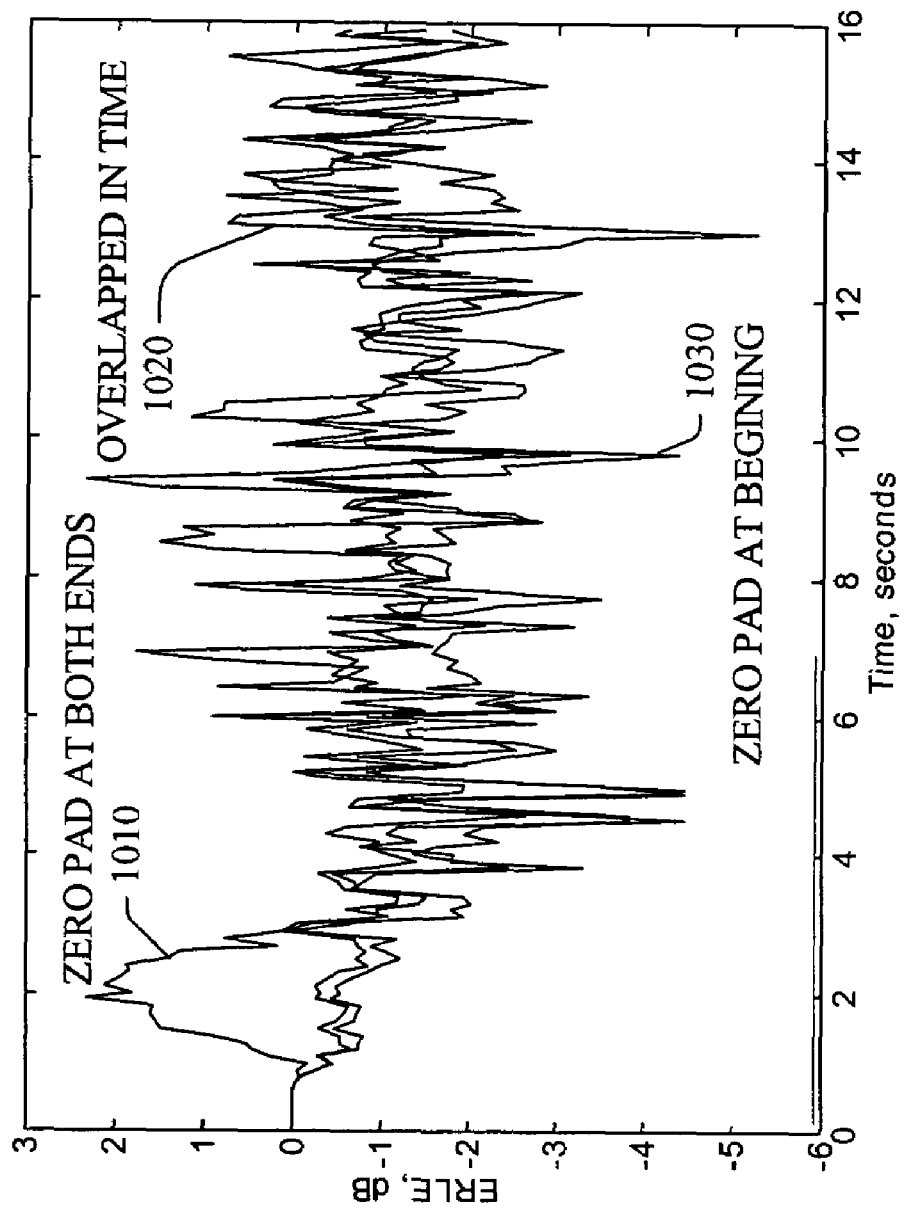
FIG. 10 illustrates exemplary echo return loss enhancement (ERLE) difference graphs averaged over 100 ms blocks.

Referring initially to FIG. 9, ERLE graphs for exact, overlapped back in time, zero padded at the beginning and zero padded at both ends techniques are depicted at 910, 920, 930 and 940, respectively. For respective graphs, N equals 5 times the frame size, or 100 milliseconds for 20 millisecond frames. FIG. 10 illustrates ERLE difference graphs. The graphs 1020, 1030 and 1010 illustrate differences between ERLE for the overlapped back in time, zero padded at the beginning and zero padded at both ends techniques and the exact frequency-domain transform, respectively.

Figure 11:
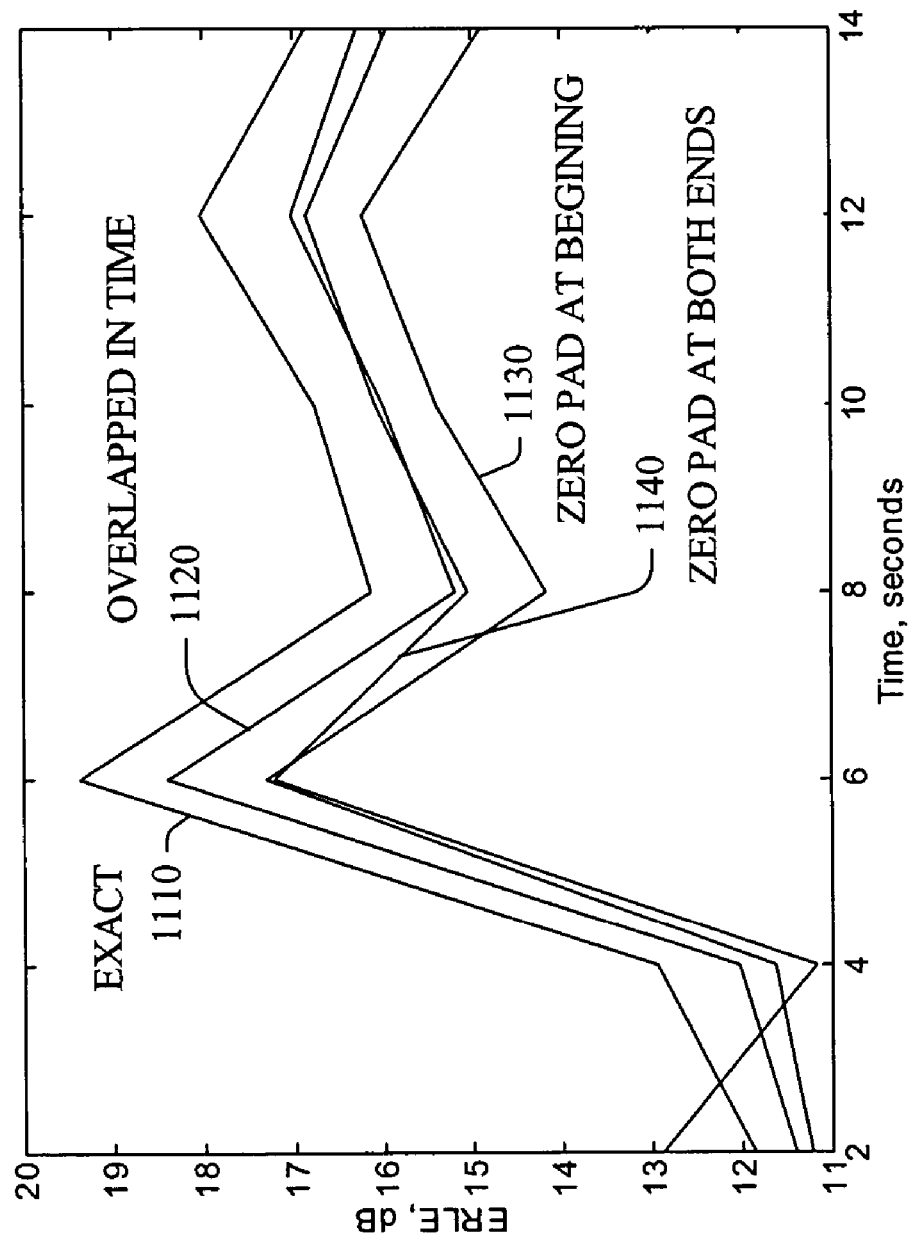
FIG. 11 illustrates exemplary echo return loss enhancement (ERLE) graphs averaged over 2 s blocks.
Figure 12:
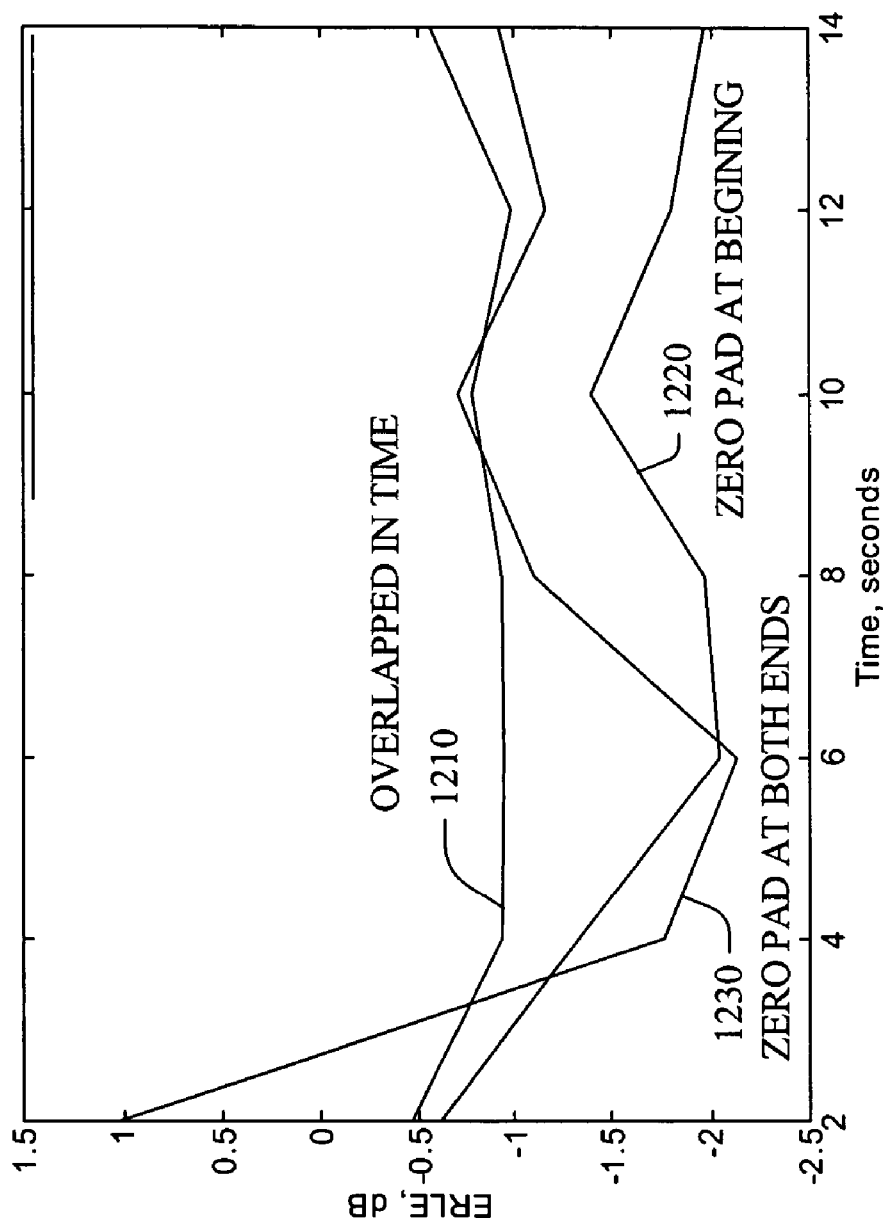
FIG. 12 illustrates exemplary echo return loss enhancement (ERLE) difference graphs averaged over 2 s blocks.

FIGS. 11 and 12 illustrate similar data, ERLE graphs and difference graphs, but N equals 100 times the frame size for 2 second blocks. FIG. 11 illustrates ERLE graphs for exact, overlapped back in time, zero padded at the beginning and zero padded at both ends techniques are depicted at 1110, 1120, 1130 and 1140, respectively. FIG. 12 illustrates ERLE difference graphs 1210, 1220, and 1230 depicting differences between ERLE for the overlapped back in time, zero padded at the beginning and zero padded at both ends techniques and the exact frequency-domain transform, respectively.

Figure 13:
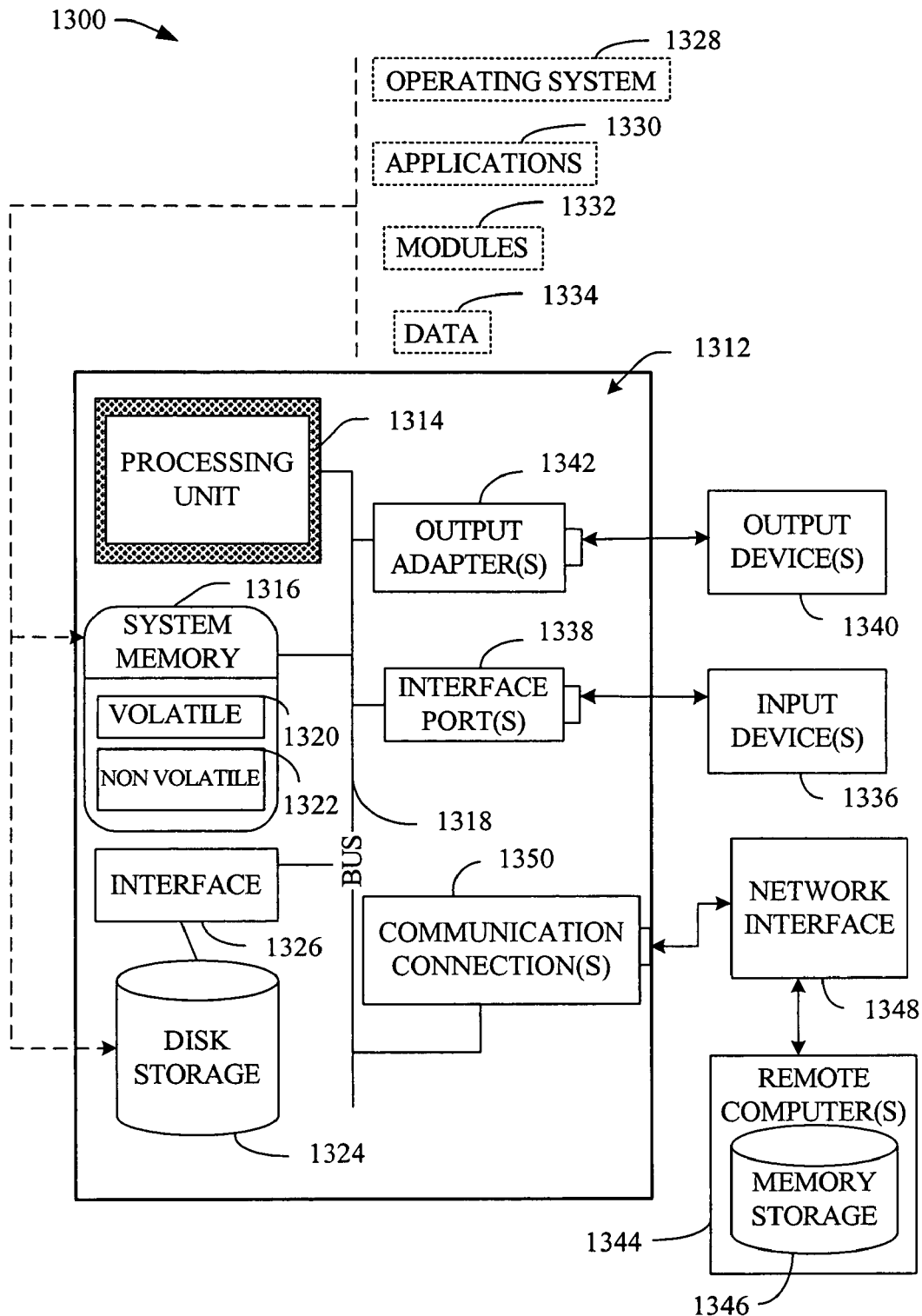
FIG. 13 illustrates an exemplary operating environment, wherein the novel aspects of the present invention can be employed.
Figure 14:
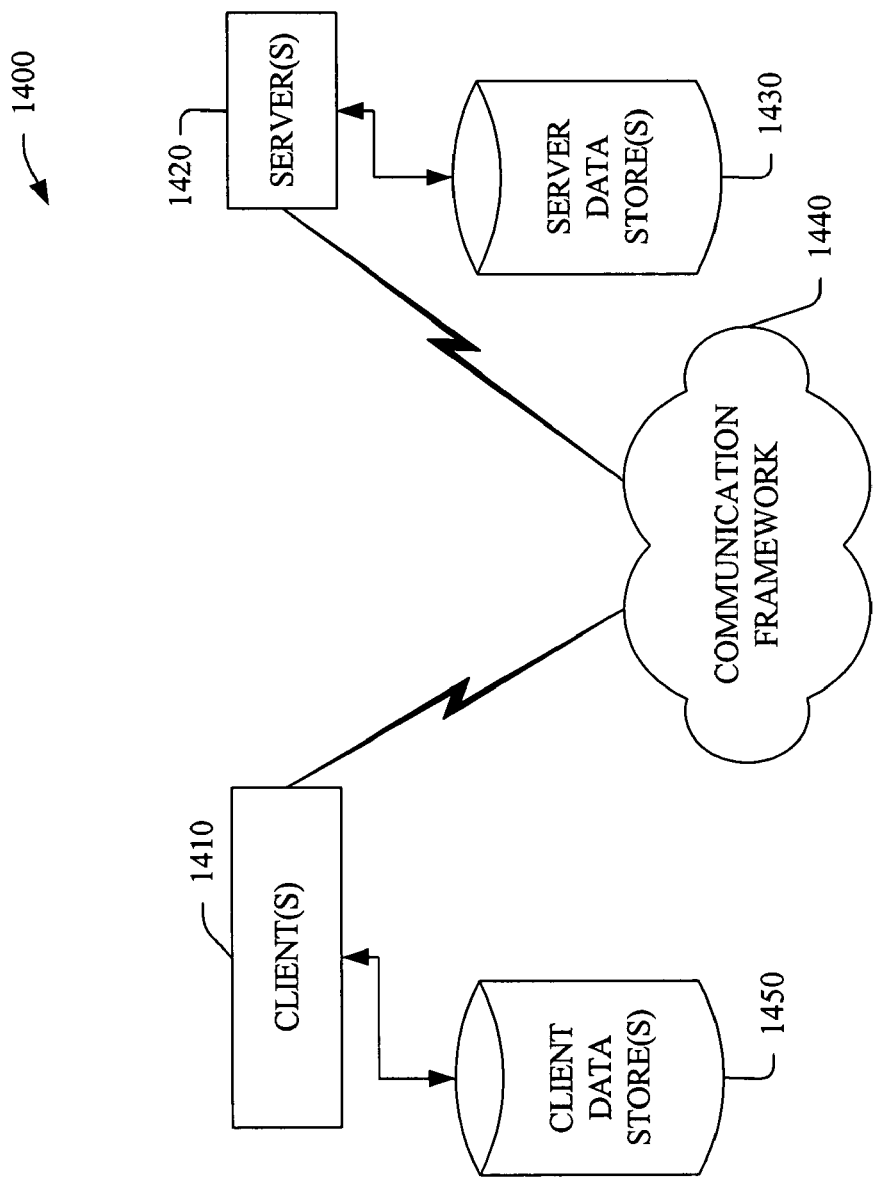
FIG. 14 illustrates an exemplary networking environment, wherein the novel aspects of the present invention can be employed.

In order to provide a context for the various aspects of the invention, FIGS. 13 and 14 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1420. The server(s) 1420 can also be hardware and/or software (e.g., threads, processes, computing devices). The servers 1420 can house threads to perform transformations by employing the present invention, for example. One possible communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the servers 1440.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that employs adaptive subband-based echo cancellation to remove echo from a captured signal, comprising:
    a frequency domain transform configured to transform a playback signal into a different number of frequency bins than that of a frequency domain transform of the captured signal;
    a converter configured to re-sample the frequency domain transformed playback signal to match the frequency bins of the frequency domain transformed captured signal; and
    a filter configured to utilize the re-sampled frequency domain transformed playback signal to remove echo from the captured signal via echo cancellation.

2. The system of claim 1, wherein the converter is configured to re-sample the frequency domain transformed playback signal via interpolation.

3. The system of claim 2, wherein the interpolation is defined by: $\hat{X}(m)=\alpha X(n)+\beta X(n+1)+ \ldots +\lambda X(n+j)+ \ldots$, wherein $\hat{X}(m)$ is an mth frequency bin of a linear interpolated transform, $\alpha X(n)$ is a product of a coefficient cx and a nth frequency bin of a transformed signal x, $\beta X(n+1)$ is a product of a coefficient $\beta$ and a nth plus one frequency bin of the transformed signal x, and $\lambda X(n+i)$ is a product of a coefficient $\lambda$ and a nth plus i frequency bin of the transformed signal x.

4. The system of claim 3, wherein $$\alpha = \left[(n+1) - m\left(\frac{\Delta \hat{X}}{\Delta X}\right)\right], \beta = \left[m\left(\frac{\Delta \hat{X}}{\Delta X}\right) - n\right],$$

$\lambda=0$, and remaining components of the expansion equal zero, where $\Delta X$ is a width of a frequency bin of the transformed signal x and $\Delta \hat{X}$ is a width of a frequency bin of the captured signal.

5. The system of claim 1, wherein a re-sample size is defined by: $M=2\hat{\ }((\lceil \log 2(N) \rceil))$, where N is a desired size, M is a power of 2 transformation size, and $\lceil \log 2(N) \rceil$ is a ceiling function of log 2(N).

6. The system of claim 1, wherein the frequency domain transform of the playback signal is a fast Fourier transform (FFT), a windowed FFT, or a modulated complex lapped transform (MCLT).

7. The system of claim 1, wherein the number of frequency bins of the frequency domain transform of the playback signal is a power of two.

8. The system of claim 1, wherein the system is a speech recognition system, an Internet gaming system, a broadband modem communication system, or a CD system.

9. An echo cancellation method, comprising:
receiving a frequency domain transform of a playback signal, the frequency domain transform of the playback signal having a number of frequency bins;
receiving a frequency domain transform of a signal that comprises a desired signal and an echo associated with the playback signal, the frequency domain transform of the signal that comprises the desired signal and the echo associated with the playback signal having a different number of frequency bins than the frequency domain transform of the playback signal;
sample converting the frequency domain transform of the playback signal to match a sampling rate of the frequency domain transform of the signal that comprises the desired signal and the echo associated with the playback signal; and
removing the echo associated with the playback signal from the signal that comprises the desired signal and the echo associated with the playback signal using the sample converted frequency domain transform of the playback signal.

10. The method of claim 9, wherein the frequency domain transforms are one of a fast Fourier transform (FFT), a windowed FFT, or a modulated complex lapped transform (MCLT).

11. The method of claim 9, wherein sample converting comprises interpolation.

12. The method of claim 11, wherein the interpolation is defined by: $\hat{X}(m)=\alpha X(n)+\beta X(n+1)+ \ldots +\lambda X(n+j)+ \ldots$, wherein $\hat{X}(m)$ is a mth frequency bin of a linear interpolated transform, $\alpha X(n)$ is a product of a coefficient $\alpha$ and a nth frequency bin of a transformed signal x, $\beta X(n+1)$ is a product of a coefficient $\beta$ and a nth plus one frequency bin of the transformed signal x, and $\lambda X(n+i)$ is a product of a coefficient $\lambda$ and a nth plus i frequency bin of the transformed signal x.

13. The method of claim 9, wherein sample converting comprises employing a re-sampled size defined by: $M=2\hat{\ }((\lceil \log 2(N) \rceil))$, where N is a desired size, M is a power of 2 transformation size, and $\lceil \log 2(N) \rceil$ is a ceiling function of log 2(N).

14. An echo cancellation system, comprising:
means for frequency transforming a received signal into a number of frequency bins;
means for frequency transforming a playback signal into a different number of frequency bins;
means for converting a sample rate of the frequency transformed playback signal to match a sample rate of the frequency transformed received signal; and
means for employing the sample converted frequency transformed playback signal to remove echo from the frequency transformed received signal.

* * * * *